United States Patent Office 2,926,481
Patented Mar. 1, 1960

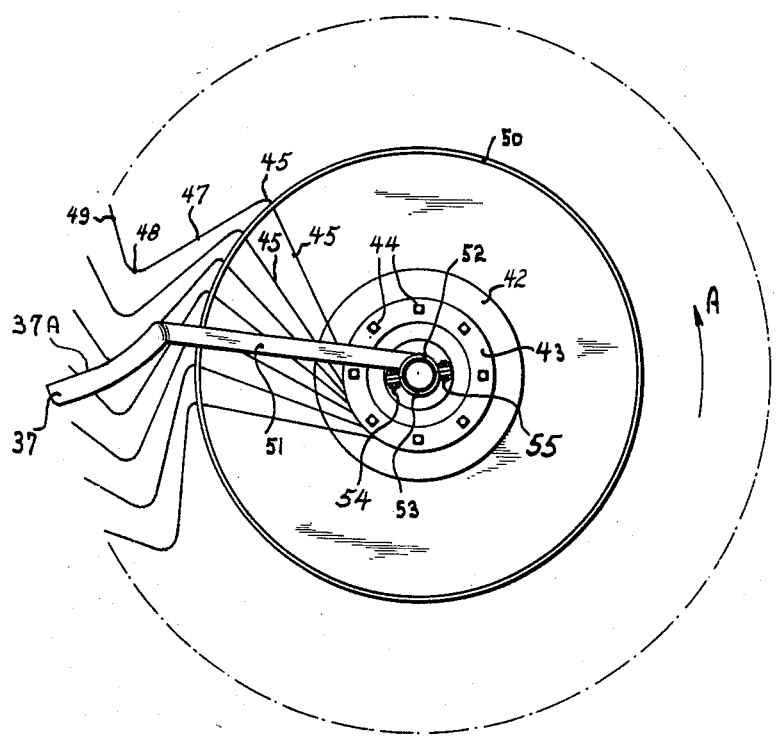

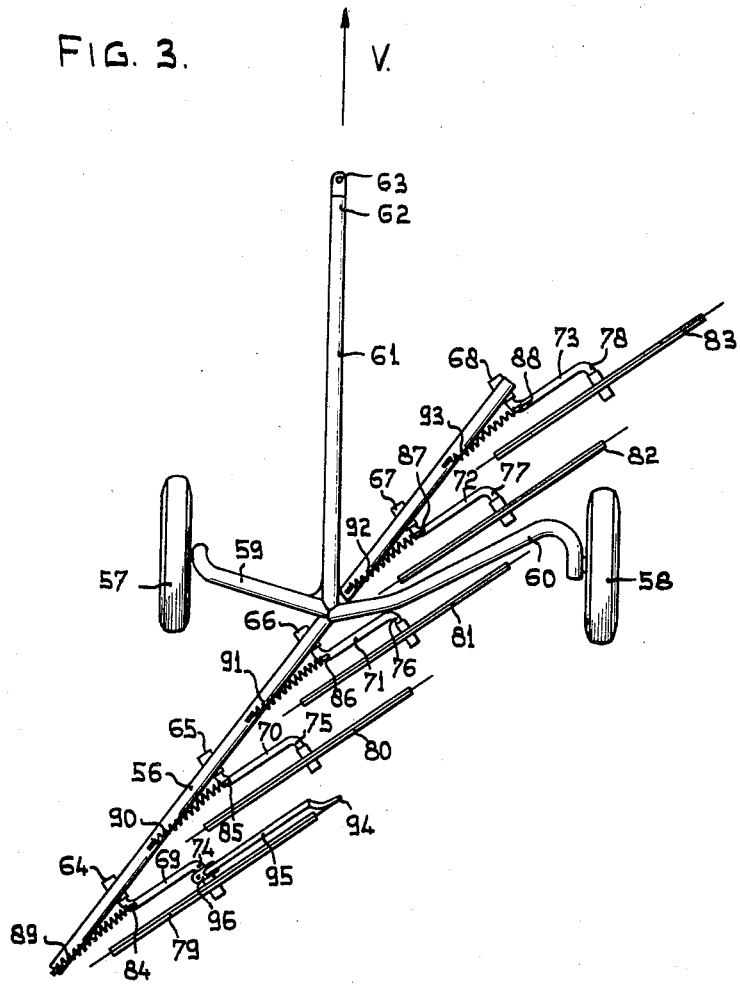

2,926,481

DEVICES FOR LATERAL DISPLACEMENT OF CROP LYING ON THE GROUND

Cornelis van der Lely and Ary van der Lely, Maasland, Netherlands, assignors to C. van der Lely N.V., Maasland, Netherlands, a Dutch limited company of the Netherlands Application May 21, 1957, Serial No. 660,615

Claims priority, application Netherlands May 26, 1956

11 Claims. (Cl. 56—395)

The invention relates to a device for laterally displacing a crop, such as hay, lying on the ground, this device being provided with a rake wheel with circumferential tines or similar catching means. Such a device may constitute, for example, a side delivery rake, a swath turner or a tedder.

The known devices of this kind may, under certain conditions, give rise to the disadvantage that a small quantity of dirt is accumulated at the point of the tine on the front side of the rake wheel. This may particularly occur with work on arable land; moreover, the kind of soil may have a certain effect. The raking effect may thus be affected adversely. The dirt on the tine, which may sometimes even form a small enlargement, hinders the crop from loosening itself from the tine, so that the crop can be carried along in the rotation of the rake wheel and be left behind.

The invention has for its object to obviate this disadvantage. To this end a stripper is provided, in accordance with the invention, on that side of the rake wheel, which is in contact with the crop; by means of this stripper the dirt adhering to the tines is scraped off. The term "dirt" is to be understood to mean herein also soil, secretions from insects or the like. During each rotation of the rake wheel the tine is thus cleaned at the front end, so that the crop can readily slip off the tine.

In one embodiment of the invention the tines are resilient. This permits of arranging the stripper in the path of the tines, so that, when touching the stripper, the tines are slightly urged aside; thus they move along the stripper with a certain amount of pressure and are kept clean.

In a further embodiment of the invention the stripper in the front of the rake wheel lies in a sector which extends from 150° to 270°, calculated from the lowest point of the rake wheel, viewed in the direction of rotation thereof. It is thus ensured that no obstacles, which might engage the crop, occur on the side where the crop leaves the rake wheel.

Further features and advantages of the invention will be evident from the description with reference to the drawing, which shows two advantageous embodiments of the invention.

Fig. 2 is an elevation taken on the line II—II of Fig. 1.

Fig. 3 is a plan view of a second embodiment.

Figure 1:
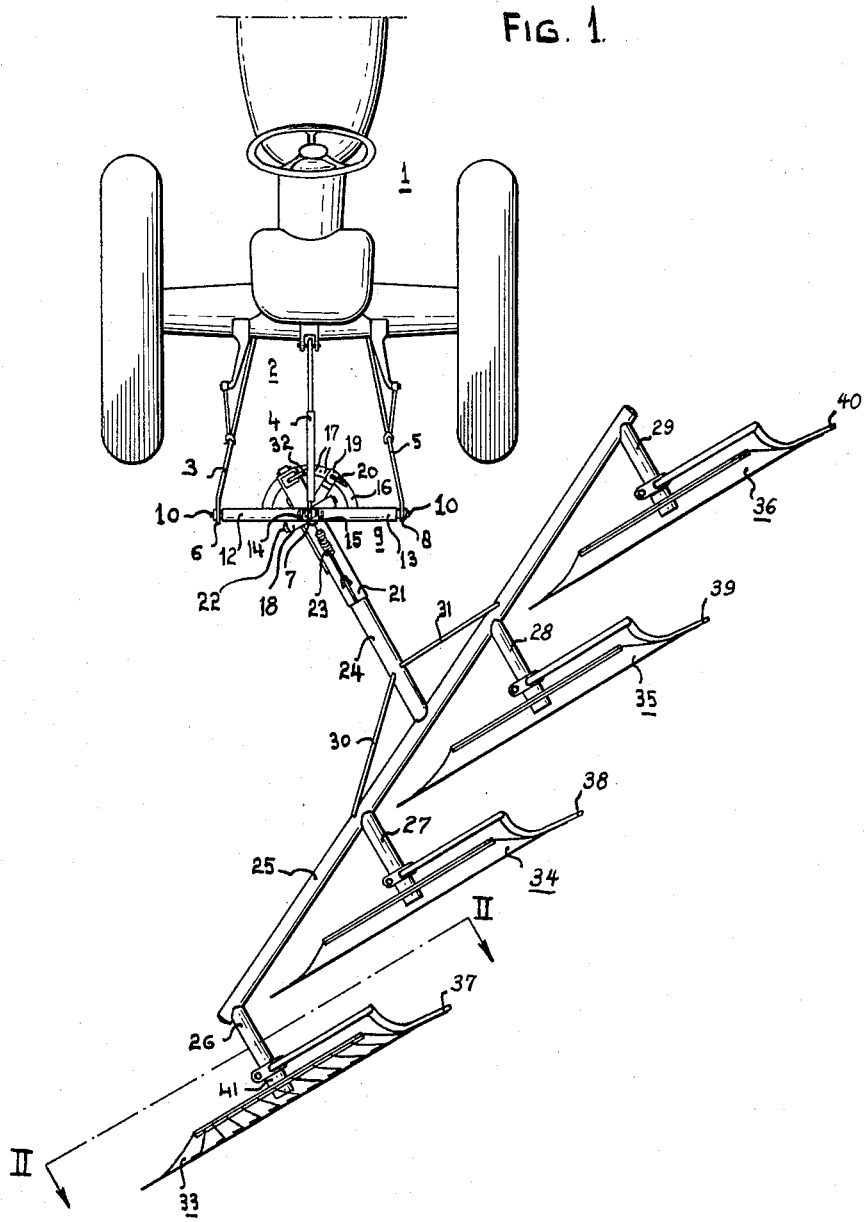
Fig. 1 is a plan view of a first embodiment.

Referring to Figure 1, a tractor 1 is provided with a lifting device 2 which has three arms 3, 4, and 5 whose rear ends 6, 7, and 8 are connected with a transverse connecting member 9 of the device. The connecting member 9 consists of a shaft 10, the ends of which are connected with the rear ends 6 and 8 of the arms 3 and 5. Near the extremities of shaft 10, as shown in Figure 1, are secured rods 12 and 13, extending obliquely up to their top ends 14 and 15, respectively, which, in turn, are connected with rear end 7 of arm 4.

A semi-circular strip 16 provided with holes 17 is secured to shaft 10. A strap 18 is secured in the transverse connecting member 9. Strap 18 is pivotable about a vertical axis (not shown). A strip 19 is secured to strap 18. The strip 19 is provided with a locking pin 20 which is located just over the curved strip 16. By inserting locking pin 20 through one of holes 17 in curved strip 16, the strap 18 can be thereby locked from rotation.

A tube 21 is secured to strap 18 so as to be pivotable about a pin 22. Between the upper portion of strap 18 and the rear portion of tube 21 is stretched a spring 23. If necessary, provision may be made for a locking device adapted to prevent tube 21 from rotating about pin 22. A shaft 24 is journalled in tube 21. The shaft 24 supports a beam 25 having shafts 26, 27, 28 and 29. The connection between shaft 24 and beam 25 is braced and strengthened by stay bars 30 and 31.

Tube 21 is provided at its forward end with a locking pin 32. By engaging locking pin 32 in a hole (not shown) in the forward end of shaft 24, the latter can be locked in its rotation in the tube 21. This hole in the forward end of shaft 24 may constitute a slot (not shown) so that rotation of shaft 24 through a small angle in tube 21 may be permitted. If desired, further holes may be provided in shaft 24 so that it may be locked in a number of positions relative to tube 21.

Rake wheels 33, 34, 35 and 36 are mounted on shafts 26, 27, 28 and 29, respectively, so as to be freely rotatable. Strippers 37, 38, 39 and 40 are secured to shafts 26, 27, 28 and 29, respectively, each just forward of the corresponding rake wheel.

As designated for the rake wheel 33, each rake wheel consists of a hub 41 which is rotatable about the shaft 26. The hub 41 is provided with a disc 42, as shown in Figure 2.

Referring now to Figure 2, a ring 43 is secured by bolts 44 to the disc 42. Between the ring 43 and disc 42 are clamped and secured rods 45. The rods 45 are curved at 46 to form supporting members 47. The supporting members 47 are curved at 48 to form teeth or tines 49. The tines thus obtained are adapted to move aside in a resilient manner when they engage the ground. The rods 45 extend adjacent their curved portions 46 through holes, not shown, in the rim 50 which is supported on the tines. The rim 50 is thus linked by rods 45 with hub 41 so that the rods 45 constitute spokes. The tines 49 point backwards relative to the direction of rotation of the rake wheel to provide angled portions.

A stripper, as shown at 37 for example, is connected with a rod 51, which, in turn, is secured to a strap 52. The strap 52 is clamped tightly on shaft 26 with the aid of a strap 53 and bolts 54 and 55. The stripper comprises a flat piece—for example the piece 37—having a sharpened edge 37A on the side touching the tines.

The device operates as follows:

During the forward movement of the tractor the rake wheels 33, 34, 35 and 36 will rotate in the direction indicated by arrow A when they touch the ground or crop, owing to their oblique position with respect to the direction of travel, and they will trail over the ground in a direction at right angles to the plane of the rake wheel. Due to this trailing movement over the ground, soil may be collected at the front ends of the tines. However, during each rotation of the rake wheel, each tine passes with its front side along the sharpened edge 37A of the stripper so that at least part of the material adhering to the tine is scraped off.

The stripper, one of which is shown at 37 in Figure 2, is arranged in such a manner that the tines are slightly deflected when they come into contact with the sharpened edge of the strippers so that they brush past the stripper with a certain amount of pressure. The cleaning of the tines is thus furthered materially. The stripper is arranged so that the larger portion of the tine brushes past the stripper in such a manner that the first point nearest the center of the rake wheel touches the stripper first. The tines are thus kept clean so that the crop or other material to be moved can slide easily along the tines and will not be caught by them.

The particular position of the stripper in front of the rake wheel may, if desired, be changed by loosening the straps 52 and 53, turning the stripper relative to the shaft to another position, and again tightening the straps 52 and 53.

The shaft 24 on which the rake wheels are mounted by means of the beam 25 is rotatable in the tube 21 in order to adapt the rake wheels to the unevenness of the field. The tube 21 is rotatable about the pin 22 in order to permit the rake wheels to move as a whole relative to the position of the tractor. By adjusting the tension of the spring 23 to a greater or lesser extent, the pressure of the rake wheels on the ground can be controlled.

By adjusting strap 18 together with the tube 21 and the rake wheels 33, 34, 35 and 36 on its vertical pivot, the operative width of the device can be varied.

Referring to Figure 3, this device comprises a frame beam 56 which is supported at least partially by two running wheels 57 and 58 which are connected to the frame beam 56 by means of supporting frame beams 59 and 60. To the frame beam 56 is furthermore secured a traction arm 61 which has a hole 63 at the forward end 62 so that the device can be moved forward by, for example, a tractor. To the frame beam 56 are secured bearings 64, 65, 66, 67 and 68 in which are journalled cranks 69, 70, 71, 72 and 73 respectively. Freely rotatable rake wheels 79, 80, 81, 82 and 83 are mounted, respectively, on pins 74, 75, 76, 77 and 78 of the foregoing cranks. To the cranks 69, 70, 71, 72 and 73 are secured fastening means comprising pins 84, 85, 86, 87, 88, respectively. To the free ends of these latter pins are secured springs 89, 90, 91, 92 and 93, respectively, each of which is in turn secured to frame beam 56. These springs serve to reduce the pressure of the rake wheels on the ground.

In order to have a simple and cheap device, only the hindmost rake wheel has added to it a stripper 94. This stripper 94 is adjustable but rigidly secured by means of an arm 95 with a strap 96 to the pin 74 in the same manner as that shown in Figure 2, and is also provided with a scraper means as is described above with respect to Figures 2 and 4. During forward movement in the direction of the arrow V, the stripper will keep the tines clean in the same manner as the strippers shown in Figures 1 and 2. Although only the rear rake wheel is provided with a stripper, this arrangement is capable of yielding satisfactory results. The crop which is lying on the ground is displaced laterally by rake wheel 83 and is taken over by rake wheel 82. In like manner, the crop which is moved aside by rake wheel 82 is taken over by rake wheel 81. Since the crop is taken over each time by the next following rake wheel, the risk of the crop being caught in the next following rotation is not so great, even though some soil should adhere to the tines. However, the crop delivered by the rake wheel 79 is no longer taken over by the next following rake wheel, so that the tines of this rake wheel must be as smooth as possible to release the crop. Consequently, the use of the stripper with this rake wheel has a very favorable effect. Since this stripper is secured to the crank, it remains in the same position relative to the rake wheel, thereby insuring a favorable cooperation between them.

The above description and drawings disclose two embodiments of the invention and specific language has been employed in describing the several figures. It will, nevertheless, be understood that no limitations of the scope of the invention are thereby contemplated and that various alterations and modifications may be made such as would occur to one skilled in the art to which the invention relates.

In the claims:

1. A device for laterally displacing a crop lying on the ground comprising a mobile frame, a shaft extending laterally from said frame, a rake wheel having outwardly extending teeth rotatably mounted on said shaft, a stripper for said teeth operatively associated with said frame and having a tooth contacting and stripping portion located forwardly with respect to said wheel and extending to substantially the ends of the teeth, said contacting and stripping portion extending obliquely to said teeth with its advance tooth contacting portion nearer to the hub of the wheel whereby as the wheel rotates the stripper will move adhering crop and/or dirt outwardly of said teeth to remove the same therefrom.

2. A device as claimed in claim 1 wherein said stripper comprises a rod having a flattened end.

3. A device as claimed in claim 2 wherein said teeth are resilient, and said outer end of said rod is disposed in the plane of said teeth so that said teeth are pushed out of their normal plane as they move past said stripper during the rotation of said wheel.

4. A device as claimed in claim 2 wherein said stripper is located in front of said wheel in a sector which extends from 150° to 270° calculated from the lowest point of said wheel viewed in its direction of rotation.

5. A device as claimed in claim 1 wherein each tooth is provided with a supporting portion, said tooth and supporting portion forming an angle of V-shape, with the apex of each tooth extending in the direction of rotation of said wheel.

6. A device as claimed in claim 1 wherein said wheel is provided with a rim, a plurality of spaced apertures in said rim, each of said teeth having a rod, said rod extending through an aperture in said rim.

7. A device as claimed in claim 6 wherein each rod is provided with a supporting member located between the rod and its tooth, said supporting member and tooth forming a V.

8. A device for laterally displacing a crop lying on the ground comprising a mobile frame, a crank arm, means pivotally mounting said crank arm from said frame, a shaft extending from said crank arm, a rake wheel having outwardly extending teeth rotatably mounted on said shaft, a stripper for said teeth operatively associated with said frame and having a tooth contacting and stripping portion located forwardly with respect to said wheel and extending to substantially the ends of the teeth, said contacting and stripping portion extending obliquely to said teeth with its advance tooth contacting portion nearer to the hub of the wheel, whereby as the wheel rotates the stripper will move adhering crop and/or dirt outwardly of said teeth to remove the same therefrom.

9. A device as claimed in claim 8 wherein said teeth are resilient, and said outer end of said rod is disposed in the plane of said teeth so that said teeth are pushed out of their normal plane as they move past said stripper during the rotation of said wheel.

10. A device as claimed in claim 8 wherein said stripper is located in front of said wheel in a sector which extends from 150° to 270° calculated from the lowest point of said wheel viewed in its direction of rotation.

11. A device as claimed in claim 8 wherein each tooth is provided with a supporting portion, said tooth and supporting portion forming an angle of V-shape, with the apex of each tooth extending in the direction of rotation of said wheel.

References Cited in the file of this patent

UNITED STATES PATENTS 2,451,402     Myers _____ Oct. 12, 1948

(Other references on following page)

UNITED STATES PATENTS

| | | |
|---|---|---|
| 2,641,895 | Richey | June 16, 1953 |
| 2,712,723 | Ryan | July 12, 1955 |

FOREIGN PATENTS

| | | |
|---|---|---|
| 1,113,379 | France | Dec. 5, 1955 |

OTHER REFERENCES

Germany (printed application), Ser. No. E7,113, Jan. 5, 1956.

Germany (printed application), Ser. No. R.12,485, Jan. 5, 1956.